(12) United States Patent
Myung et al.

(10) Patent No.: US 11,482,750 B2
(45) Date of Patent: Oct. 25, 2022

(54) BATTERY PACK AND VEHICLE COMPRISING THE SAME

(71) Applicant: LG Chem, Ltd., Seoul (KR)

(72) Inventors: Eui-Hoon Myung, Daejeon (KR); Tae-Hyun Kim, Daejeon (KR); Yoon-Woo Park, Daejeon (KR)

(73) Assignee: LG Energy Solution, Ltd.

( * ) Notice: Subject to any disclaimer, the term of this patent is extended or adjusted under 35 U.S.C. 154(b) by 143 days.

(21) Appl. No.: 16/754,936

(22) PCT Filed: Feb. 8, 2019

(86) PCT No.: PCT/KR2019/001592
§ 371 (c)(1),
(2) Date: Apr. 9, 2020

(87) PCT Pub. No.: WO2020/004764
PCT Pub. Date: Jan. 2, 2020

(65) Prior Publication Data
US 2020/0266402 A1    Aug. 20, 2020

(30) Foreign Application Priority Data
Jun. 26, 2018 (KR) .................. 10-2018-0073501

(51) Int. Cl.
*H01M 50/10* (2021.01)
*H01M 50/20* (2021.01)
*H01M 50/147* (2021.01)

(52) U.S. Cl.
CPC ......... *H01M 50/20* (2021.01); *H01M 50/147* (2021.01); *H01M 2200/20* (2013.01); *Y02E 60/10* (2013.01)

(58) Field of Classification Search
CPC ............. H01M 50/20; H01M 2200/20; H01M 50/147; Y02E 60/10
See application file for complete search history.

(56) References Cited

U.S. PATENT DOCUMENTS 4,119,772 A * 10/1978 Peters ................. H01M 50/463
429/204
2011/0003193 A1 1/2011 Park et al.
(Continued)

FOREIGN PATENT DOCUMENTS

CN 203071146 U 7/2013
CN 204516814 U 7/2015
(Continued)

OTHER PUBLICATIONS

Search report from International Application No. PCT/KR2019/001592, dated May 15, 2019.
(Continued)

*Primary Examiner* — Jonathan G Jelsma
*Assistant Examiner* — Omar M Kekia
(74) *Attorney, Agent, or Firm* — Lerner, David, Littenberg, Krumholz & Mentlik, LLP

(57) ABSTRACT

The battery pack according to the present disclosure includes a cell module assembly, a pack case including a case body to receive the cell module assembly and a case cover coupled with the case body to package the cell module assembly, and a horizontal protruding rib protruding toward the cell module assembly in a direction parallel to a stack direction of cells in the cell module assembly at an inner lower end of the case body, wherein the horizontal protruding rib is a double rib structure including a first rib which is compressed by the cell module assembly to absorb a thickness tolerance of the cell module assembly, and an uncompressible second rib which is provided on an outer side of the first rib and disposed at a more rear position than the first rib to reinforce the first rib.

9 Claims, 11 Drawing Sheets

(56) References Cited

U.S. PATENT DOCUMENTS

| | | |
|---|---|---|
| 2013/0183573 A1 | 7/2013 | Yoshioka et al. |
| 2013/0236754 A1 | 9/2013 | Lim |
| 2014/0242429 A1 | 8/2014 | Lee et al. |
| 2016/0260946 A1 | 9/2016 | Ochi et al. |
| 2018/0053922 A1 | 2/2018 | Van Roon et al. |
| 2018/0102573 A1* | 4/2018 | Tsuruta ............... H01M 10/647 |
| 2018/0366698 A1 | 12/2018 | An et al. |

FOREIGN PATENT DOCUMENTS

| | | |
|---|---|---|
| JP | H11271409 A | 10/1999 |
| JP | H11345631 A | 12/1999 |
| JP | 2005353472 A | 12/2005 |
| JP | 8900227 B2 | 4/2007 |
| JP | 2013168356 A | 8/2013 |
| JP | 2015141890 A | 8/2015 |
| JP | 2018006058 A | 1/2018 |
| JP | 2019160715 A | 9/2019 |
| KR | 20110002355 A | 1/2011 |
| KR | 20130102502 A | 9/2013 |
| KR | 20150083156 A | 7/2015 |
| WO | 2012164730 A1 | 12/2012 |
| WO | 2015145927 A1 | 10/2015 |
| WO | 2018052189 A1 | 3/2018 |

OTHER PUBLICATIONS

Extended European Search Report including Written Opinion for Application No. EP19825290.0 dated Dec. 21, 2020, 6 pgs.

Search Report dated Feb. 21, 2022 from the Office Action for Chinese Application No. 201980004881.5 dated Mar. 1, 2022, 3 pages. [See p. 1-2, categorizing the cited references].

* cited by examiner (a)

(b)

BATTERY PACK AND VEHICLE COMPRISING THE SAME

CROSS-REFERENCE TO RELATED APPLICATIONS

The present application is a national phase entry under 35 U.S.C. § 371 of International Application No. PCT/KR2019/001592 filed Feb. 8, 2019, which claims priority from Korean Application No. 10-2018-0073501 filed Jun. 26, 2018, all of which are incorporated herein by reference.

TECHNICAL FIELD

The present disclosure relates to a battery pack and a vehicle comprising the same, and more particularly, to a battery pack with means for fixing a Cell Module Assembly (CMA) and a vehicle comprising the same.

BACKGROUND ART

Due to their high applicability to various products and electrical properties such as high energy density, secondary batteries are not only commonly applied to portable devices, but universally applied to Electric Vehicles (EVs) including Plug-in Electric Vehicles (PEVs) and Plug-in Hybrid Electric Vehicles (PHEVs) that drive on an electric driving source. Secondary batteries are gaining attention for their primary advantage of remarkably reducing the use of fossil fuels and not generating by-products from the use of energy, making them a new eco-friendly and energy efficient source of energy.

Currently, commonly used secondary batteries include lithium ion batteries, lithium polymer batteries, nickel cadmium batteries, nickel hydrogen batteries, and nickel zinc batteries. A cell, which is a basic unit of a secondary battery, has the working voltage of about 2.5V~4.6V. When a higher output voltage is required, cells may be connected in series to form a battery pack. Additionally, a battery pack may be formed by connecting cells in parallel based on the charge/discharge capacity required for the battery pack. Accordingly, the number of cells in the battery pack may be varied based upon the desired output voltage or charge/discharge capacity.

Meanwhile, when a battery pack is formed by connecting cells in series/in parallel, the battery pack is generally formed by forming a battery module including at least one cell and then adding other components to the battery module to manufacture a cell module assembly.

FIG. 1 is an exploded perspective view of a conventional battery pack.

The conventional battery pack 10 includes a cell module assembly 20 and a pack case 30. The pack case 30 includes a case body 40 to house the cell module assembly 20 and a case cover 50 connected with the case body 40 to package the cell module assembly 20.

The cell module assembly 20 includes a stacked body including cells stacked with wide surfaces facing each other. The cell module assembly 20 is received in the case body 40 along a direction perpendicular to the stack direction of the cells. In the conventional battery pack 10, a horizontal protruding rib 42, as shown in FIG. 2a, is used to fix the cell module assembly 20 within the case body 40. FIG. 2a is an enlarged perspective view of the horizontal protruding rib 42. The horizontal protruding rib 42 is formed at the inner lower end of the case body 40, and protrudes toward the cell module assembly along a direction parallel to the stack direction of the cells. FIG. 2b is an enlarged top view of the horizontal protruding rib 42 with the cell module assembly 20 being received in the case body 40. As shown in FIG. 2b, when the cell module assembly 20 is received in the case body 42, the horizontal protruding rib 42 comes into contact with the cell module assembly 20, and compresses.

As described above, the conventional horizontal protruding rib 42 is compressed by the cell module assembly 20 to absorb the thicknesswise dimensional tolerance (hereinafter, thickness tolerance) of the cell module assembly 20. However, conventionally, biased assembly may occur according to how much the horizontal protruding rib 42 is compressed. Additionally, after assembling is completed, when an external force is applied to the battery pack 10, the horizontal protruding rib 42 may be additionally compressed by the mass of the cell module assembly 20 and the inertia.

DISCLOSURE

Technical Problem

The present disclosure is directed to providing a battery pack including a pack case for increasing the accuracy of assembling and reducing the extent of additional compression by an external force.

The present disclosure is further directed to providing a vehicle comprising the battery pack.

Technical Solution

To solve the above-described problem, the present disclosure provides a battery pack including a cell module assembly, a pack case including a case body to receive the cell module assembly and a case cover coupled with the case body to package the cell module assembly, and a horizontal protruding rib protruding toward the cell module assembly in a direction parallel to a stack direction of cells in the cell module assembly at an inner lower end of the case body, wherein the horizontal protruding rib is a double rib structure including a first rib which is compressed by the cell module assembly to absorb a thickness tolerance of the cell module assembly, and at least one uncompressible second rib provided on a lateral side of the first rib and disposed at a more rear position than the first rib to reinforce the first rib.

The horizontal protruding rib may include two second ribs, each of which is positioned on an opposite lateral side of the first rib.

The first rib and the second rib may be an integrally formed structure.

The first rib may have a length protruding further toward the cell module assembly than the second rib, and a smaller thickness than the second rib.

The first rib and the second rib may include a curved part having a gradual increase in length toward the cell module assembly along a direction in which the cell module assembly is received in the case body, and a straight line part formed with a uniform length proximate the curved part.

The curved part of the second rib may be formed more sharply than the curved part of the first rib.

The horizontal protruding rib may be a tapered structure having a gradual reduction in thickness as it is closer to the cell module assembly when an inside of the case body is viewed from an upper surface of the case body.

A plurality of horizontal protruding ribs may be formed at facing locations to fix two surfaces of the cell module assembly along a direction parallel to the stack direction of cells in the cell module assembly.

The case body and the horizontal protruding rib may be an integrally formed structure.

Additionally, to solve the above-described other problem, the present disclosure provides a vehicle including the battery pack according to the present disclosure.

Advantageous Effects

The present disclosure proposes a double rib structure as means for fixing the cell module assembly within the battery pack. According to the present disclosure, the first rib of the horizontal protruding rib with the double rib structure can absorb the thickness tolerance of the cell module assembly. At the same time, biased assembly and additional compression can be reduced or prevented by the second rib of the horizontal protruding rib.

As described above, according to the present disclosure, it is possible to increase the accuracy when assembling the cell module assembly, and prevent the cell module assembly from being displaced from the fixed location by an external force. Accordingly, the present disclosure provides a battery pack with improved accuracy of assembling the battery pack, and good structural stability against an external impact during the use of the battery pack.

The battery pack has good stability and can be used for a long term, and thus a vehicle including the same has good safety.

BRIEF DESCRIPTION OF DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

MODE FOR DISCLOSURE

Figure 1:
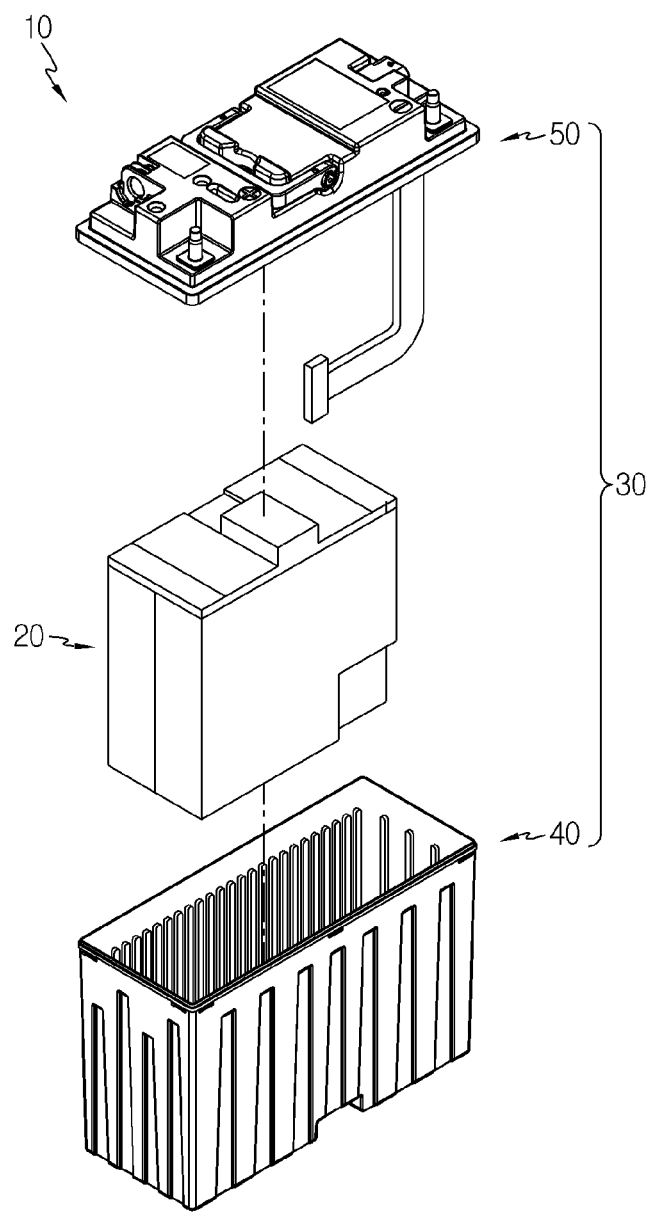
FIG. 1 is an exploded perspective view of a conventional battery pack.

The present disclosure will be apparent by describing the preferred embodiments of the present disclosure in detail with reference to the accompanying drawings. It should be understood that the disclosed embodiments are provided for illustration purposes to help the understanding of the present disclosure, and the present disclosure may be embodied in a variety of different forms other than the disclosed embodiments. Additionally, to help the understanding of the present disclosure, the accompanying drawings are not shown in the actual scale, and some components may be exaggerated. In the drawings, like reference signs indicate like elements.

The embodiment as described hereinafter relates to a cell module assembly fixing structure of a battery pack having a nominal voltage of 12V.

Figure 3:
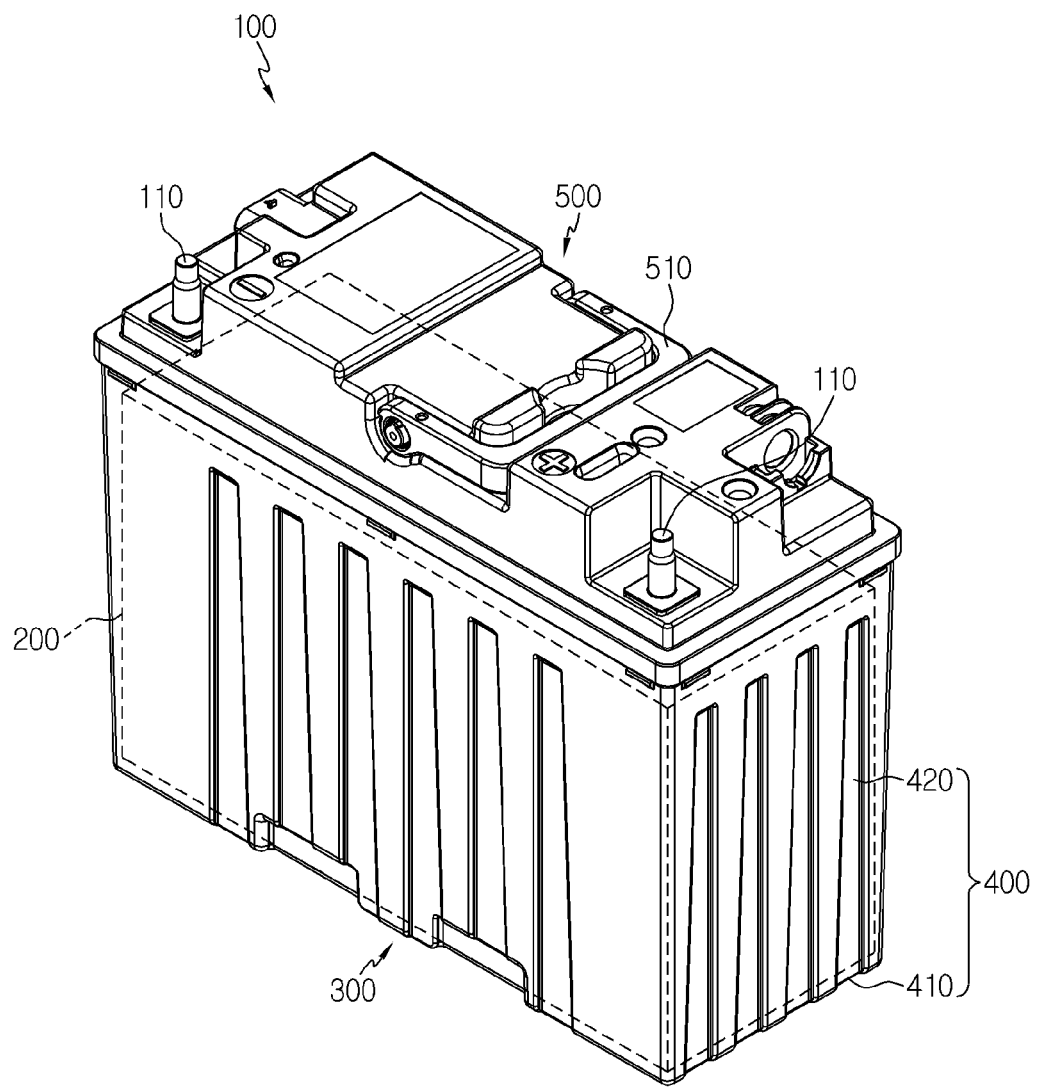
FIG. 3 is a perspective view of a battery pack according to the present disclosure.

FIG. 3 is a perspective view of the battery pack according to the present disclosure.

Referring to FIG. 3, the battery pack 100 may be used in place of a traditional 12V lead storage battery of a vehicle. The battery pack 100 may be provided in an electric vehicle as an energy source. The use of the battery pack 100 is not limited thereto, and the battery pack 100 may be used as a domestic or industrial energy source, for example, an Energy Storage System.

The battery pack 100 includes a cell module assembly 200 and a pack case 300. When the battery pack 100 is provided in a vehicle, to establish an electrical connection between positive and negative terminals 110 of the battery pack 100 and the vehicle through a power cable, the positive and negative terminals 110 may be exposed to the outside of the pack case 300 through a through-hole for an electrode terminal provided in the pack case 300 for the convenience of connection with the power cable. According to the purpose of use of the battery pack 100, the design of the pack case 300 may be variously changed.

The cell module assembly 200 includes electrical components together with a battery module including at least one cell, and the electrical components are also referred to as electrical equipment.

Figure 4:
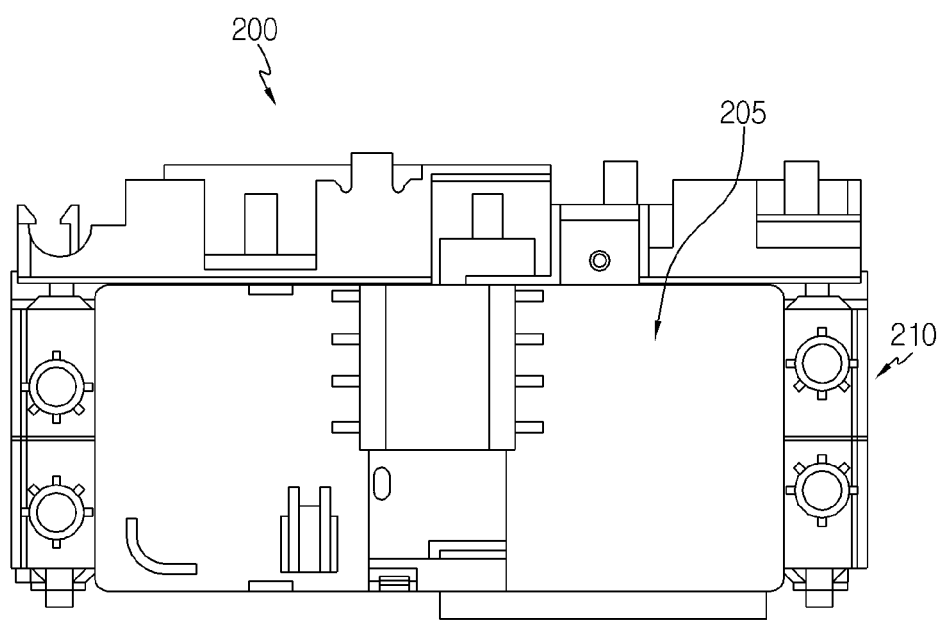
FIG. 4 is a top view of a cell module assembly that may be included in the battery pack of FIG. 3.
Figure 5:
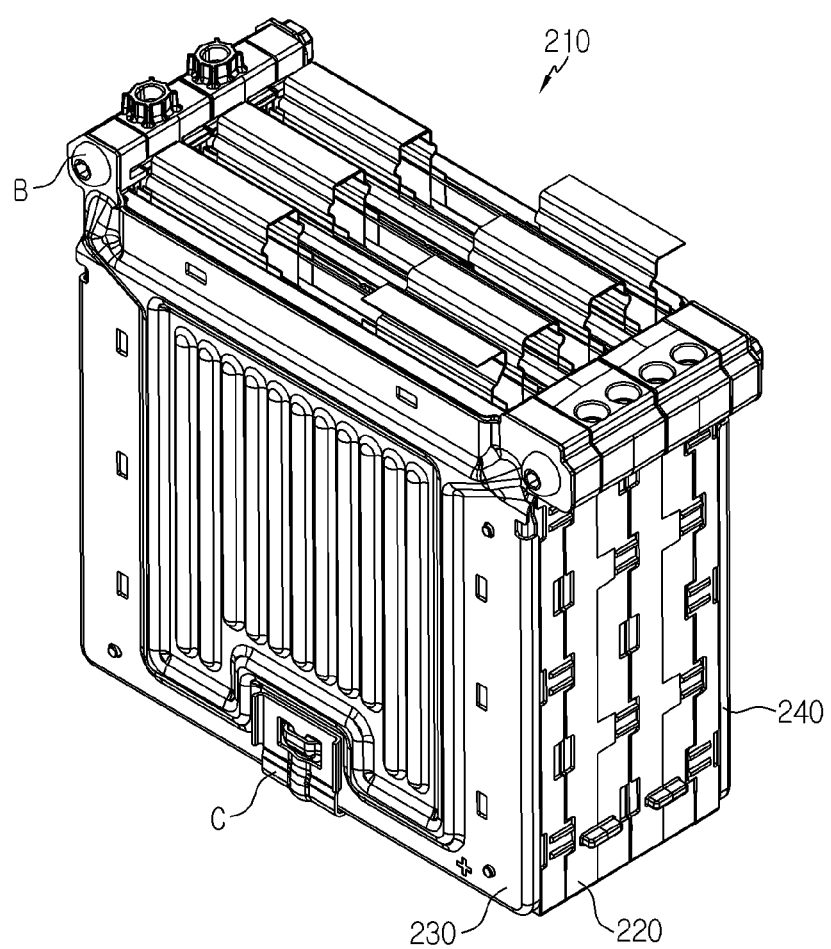
FIG. 5 is a perspective view of a battery module that may be included in the cell module assembly of FIG. 4.
Figure 6:
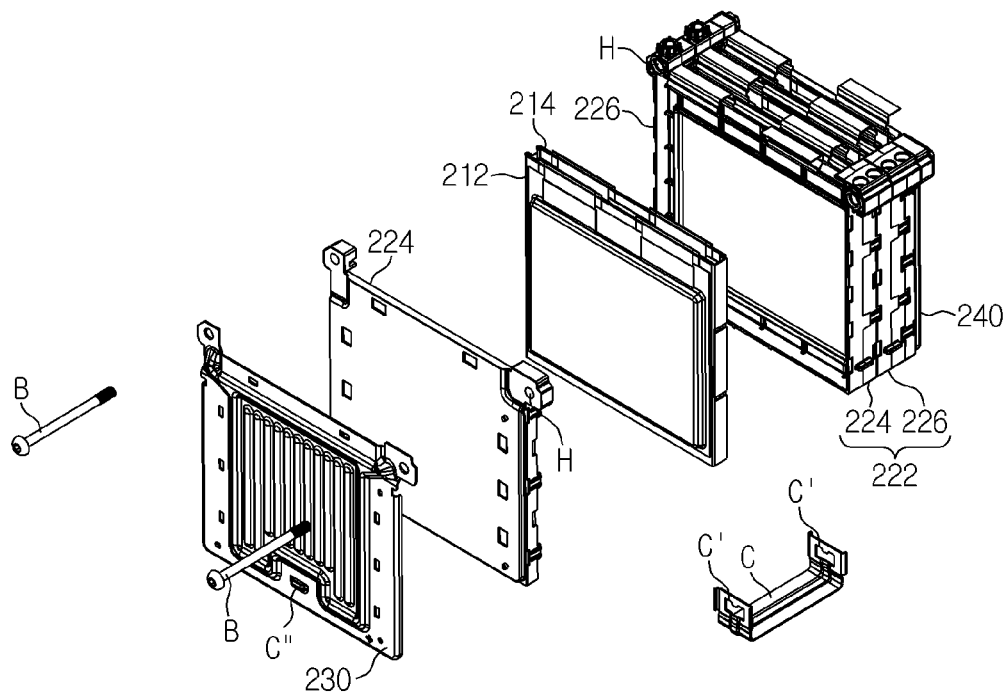
FIG. 6 is an exploded perspective view showing the battery module of FIG. 5.

FIG. 4 is a top view of the cell module assembly that may be included in the battery pack of FIG. 3. FIG. 5 is a perspective view of the battery module that may be included in the cell module assembly of FIG. 4. FIG. 6 is an exploded perspective view showing the battery module of FIG. 5.

Referring to FIG. 4, the cell module assembly 200 includes electrical equipment 205 and a battery module 210. In this embodiment, the electrical equipment 205 is positioned on the top of the battery module 210.

Typical examples of the electrical equipment 205 include detection means such as a voltage sensor and a temperature sensor, and control means such as a Battery Management System (BMS) manufactured using a Printed Circuit Board (PCB). The electrical equipment is a component for managing the charge/discharge of the cells included in the battery pack 100, and ensuring safety.

When overvoltage, overcurrent and overheating occurs in the cells, there is a safety risk and high likelihood of operational inefficiency of the battery pack 100. Accordingly, detection means is required. The detection means such as the voltage sensor and the temperature sensor is connected to the cells to check the operational state in real time or at a predetermined time interval, and the control means such as the BMS performs control, and that is the reason why the battery module 210 additionally includes the detection means and the control means. Besides, the cell module assembly 200 may further include an additional device, for example, a heatsink to properly manage the temperature of the relay assembly and the cells, a cooler, or the like. The relay assembly may be a component for switching on/off the current in the battery pack 100 by selectively opening or closing the charge/discharge path along which the current flows. Through this, it is possible to interrupt the flow of the charge/discharge current when an abnormal situation occurs in the battery pack 100.

Referring to FIG. 5, in the cell module assembly 200, the battery module 210 has a structure in which, in fixing the stacked body formed by stacking the cells, pressure is applied to two surfaces of the stacked body using end plates 230, 240 covering the two wide surfaces of the stacked body, to prevent the cells from moving in a direction parallel to the stack direction (thicknesswise direction) of the cells.

Further referring to FIGS. 5 and 6, the battery module 210 includes a cell cartridge stack formed by stacking a plurality of cell cartridges 220 and a pair of end plates 230, 240 covering two surfaces of the cell cartridge stack. In the battery module 210, the electrical equipment (205 in FIG. 4) may be positioned on the side of the end plates 230, 240 or the top of the battery module 210 to form the cell module assembly (200 in FIGS. 3 and 4).

The cell cartridge 220 includes a cell stack formed by stacking a pair of pouch cells 212, 214, and a cartridge 222 that houses the cell stack. The cartridge 222 includes a first cartridge 224 coupled from one side surface of the cell stack and a second cartridge 226 coupled from the other side surface of the cell stack.

A large-scale battery pack such as a 12V battery pack is preferably manufactured in its size and weight that are as small as possible, and due to high integration density and small weight relative to capacity, a prismatic cell and a pouch cell may be used as a unit cell. The pouch cells 212, 214 use an aluminum laminate sheet for a packaging material that is suitable for the battery module 210 due to their small weight and low manufacturing costs.

The battery module 210 includes a plurality of pouch cells. The pouch cells may be stacked in one direction, for example, a vertical or horizontal direction. In this embodiment, the pouch cells are stacked with the wide surfaces facing each other. In this instance, the cartridge 222 is used to stack and assemble the pouch cells and prevent them from moving.

Meanwhile, the first cartridge 224 and the second cartridge 226 that form the cell cartridge 220 and the end plates 230, 240 have coupling holes H formed at two upper corner areas. When coupling bolts B are inserted into the coupling holes H, the first cartridge 224 and the second cartridge 226 are coupled to each other, and the plurality of cell cartridges 220 are coupled together. Meanwhile, a coupling clip C is mounted on the center of the bottom of each of the pair of end plates 230, 240 to maintain the coupling between the end plates 230, 240 more tightly. The coupling clip C is bent in the shape of '⊏' and has a snapfit hole C' at two ends. The snapfit holes C' may be hook-coupled to snapfit protrusions C" provided at the lower part of the end plates 230, 240.

Additionally, the cell cartridge stack and the end plates 230, 240 are coupled by the coupling using the bolt B and the clip C, and the end plates 230, 240 apply the pressure to the cell cartridge stack to prevent the movement between the plurality of cell cartridges 220.

Although the drawings of the present disclosure show three cell cartridges 220 included in one battery module 210, the present disclosure is not limited thereto, and a smaller or larger number of cell cartridges 220 may be applied according to the required voltage and/or capacity of the battery pack.

Referring back to FIG. 3, the pack case 300 is used to package the cell module assembly 200, and may include a case body 400 and a case cover 500.

The case body 400 may have a receiving space in which the cell module assembly 200 is received. For example, the case body 400 may have an internal space with the open top, and the cell module assembly 200 may be received in the internal space. The cell module assembly 200 is received in the case body 400 along a direction perpendicular to the stack direction of the cells.

The case body 400 serves to protect the cell module assembly 200 from an outside environment and fix the cell module assembly 200 therein. In the illustrated example, the case body 400 includes a base plate 410 that forms a bottom, and an outerwall plate 420 positioned erect against the base plate 410 to form a wall. To fix the cell module assembly 200, the case body 400 further includes a horizontal protruding rib, and for example, the horizontal protruding rib is formed in the base plate 410. The structure and function of the horizontal protruding rib will be described with reference to FIGS. 7 to 10 below.

The case body 400 is a component that provides a mechanical support for the cell module assembly 200 and protects the cell module assembly 200 from an external impact, and preferably, is manufactured with sufficient stiffness. Preferably, the material of the case body 400 may include polyamide copolymer (typically, LG Chem LUMID). For example, the material of the case body 400 may be engineering plastic such as glass fiber reinforced polyamide. The material of the case body 400 preferably has the flame retardant property of UL94 V0, and preferably includes a halogen free flame retardant. For example, the material of the case body 400 may be a mixture of synthetic resin such as polyamide66 (PA66) with 25% glass fiber (GF), and a halogen free flame retardant may be added thereto. Besides, the material of the case body 400 may be Poly Phenylene Sulfide (PPS), Poly Ether Ether Ketone (PEEK), Poly Phenylene Sulfone (PPSU) or Poly Sulfone (PSU). The thickness of the outerwall plate 420 of the case body 400, i.e., the wall thickness may be, for example, 2.5 mm.

The case body 400 may be manufactured by injection molding of industrial thermoplastic, for example, engineering plastic. When a cavity of a mold for manufacturing the case body 400 is shaped, taking into account the horizontal protruding rib of the present disclosure, followed by injection molding, the case body 400 having the horizontal protruding rib may be integrally formed. That is, the horizontal protruding rib is not formed by additionally attaching or adhering a separate structure to the case body 400, and may be integrally formed in the manufacture of the case body 400. The horizontal protruding rib and the case body 400 are seamlessly connected to each other. Accordingly, the manufacturing process is not complex, and there is no need to consider and manage the coupling of the horizontal protruding rib and the case body 400 that should be considered when the two are separate structures, and besides, it is structurally firm.

The case body 400 may package the cell module assembly 200 when coupled with the case cover 500. The case cover 500 covers the open top of the case body 400 such that the case body 400 may be covered and closed with the case cover 500. The case body 400 and the case cover 500 may be coupled by edge welding, snapfit, or bolt coupling. Additionally, the case cover 500 may further include a handle 510 for the purpose of convenience of transportation.

The case cover 500 may include other components connected to various components of the cell module assembly 200. In the same way as the case body 400, the case cover 500 is preferably manufactured with sufficient stiffness.

Additionally, the case cover 500 is preferably made of an insulating material to prevent an external short circuit accident with the positive and negative terminals 110 exposed to the outside.

Figure 7:
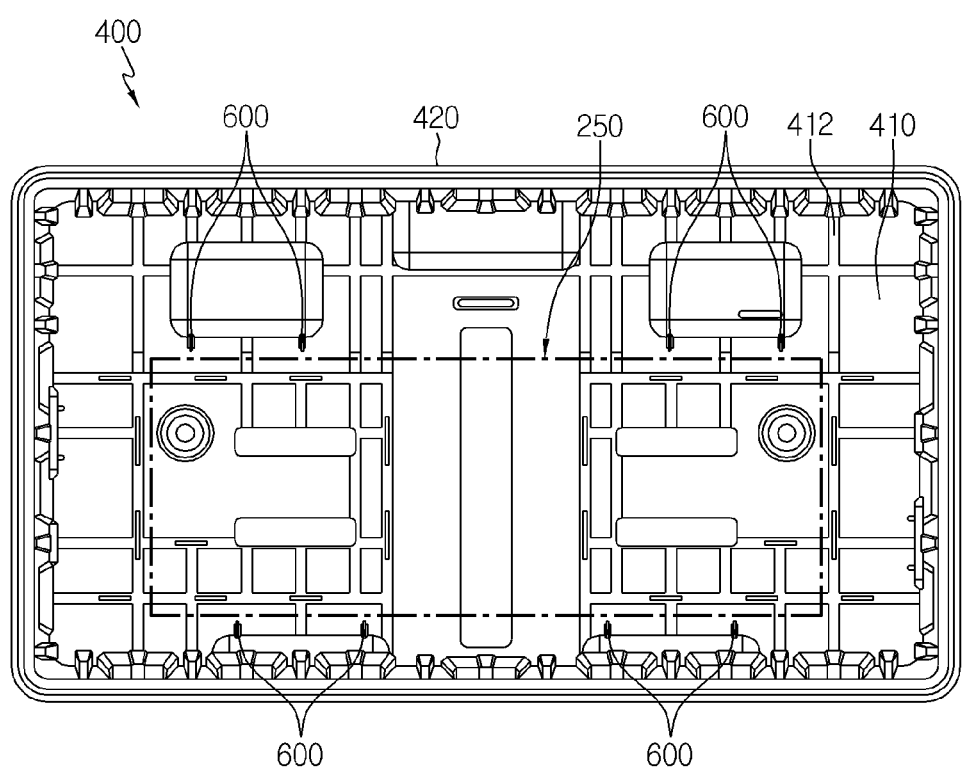
FIG. 7 is a top view illustrating the location of a horizontal protruding rib within a case body in a battery pack of the present disclosure.
Figure 8:
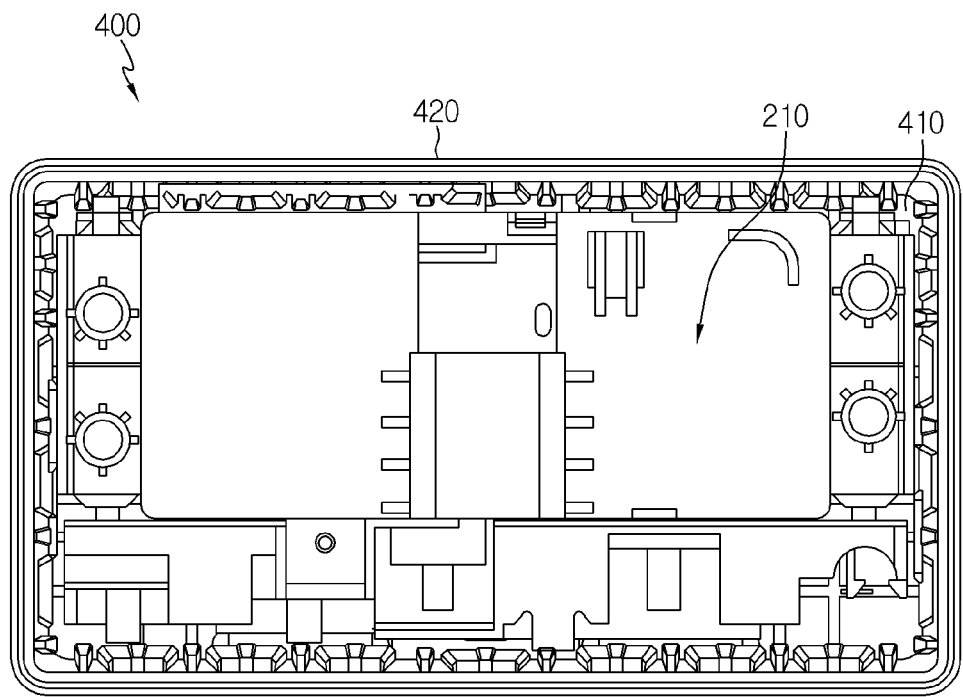
FIG. 8 is a top view of a cell module assembly received in a case body in a battery pack of the present disclosure.

FIG. 7 is a top view illustrating the location of the horizontal protruding rib within the case body in the battery pack of the present disclosure, and FIG. 8 is a top view of the cell module assembly received within the case body in the battery pack of the present disclosure, showing the inside of the case body viewed from the top of the case body.

Referring to FIG. 7, the horizontal protruding rib 600 is formed at the inner lower end of the case body 400. The horizontal protruding rib 600 may be formed in the base plate 410. The base plate 410 may further include various protrusion structures 412 to receive and protect the cell module assembly. The horizontal protruding rib 600 may protrude from the protrusion structure 412. For example, the horizontal protruding rib 600 is a structure that protrudes in the horizontal direction (a direction parallel to the base plate 410) from the protrusion structure 412, and may be formed toward the cell module assembly.

In FIG. 7, the reference number "250" indicates a location at which the cell module assembly (200 in FIGS. 3 and 4) will be mounted, and denotes an area corresponding to the outer periphery of the cell module assembly. As shown, the horizontal protruding rib 600 is formed near the area 250 corresponding to the outer periphery of the cell module assembly, and protrudes toward the cell module assembly in a direction parallel to the stack direction (see FIG. 5) of the cells in the cell module assembly that will be inserted later. Additionally, a plurality of horizontal protruding ribs 600 may be formed at facing locations to fix the two surfaces of the cell module assembly along the direction parallel to the stack direction of the cells in the cell module assembly. The plurality of horizontal protruding ribs 600 may be arranged at an interval.

In the case body 400, the cell module assembly inserted downward and received as conventionally as shown in FIG. 1 is shown in FIG. 8. For example, the end plates 230, 240 in the battery module 210 shown in FIG. 5 are inserted and received in direct contact with the horizontal protruding rib 600.

The cell module assembly 200 may have a thickness tolerance due to the thickness tolerance of the cell. In the battery module 210 shown in FIG. 5, the material of the end plates 230, 240 may be hot-dip zinc-coated steel sheet (for example, EN standards HX340LAD+ZF) or prepainted hot-dip zinc-coated steel sheet (for example, JIS standards CGCHS340Y), and the thickness may be 1.0 mm. The stiffness of the horizontal protruding rib 600 of the material as described above is weaker than the stiffness of the end plates 230, 240 of this material, and thus, when there is a thickness tolerance of the cell module assembly 200, the horizontal protruding rib 600 can absorb the thickness tolerance when compressed.

The battery pack 100 of the present disclosure is a structure in which the cell module assembly 200 including the stacked cells is received in the case body 400, the case body 400 and the case cover 500 are coupled and hermetically closed, and the horizontal protruding rib 600 within the case body 400 fixes the cell module assembly 200 when compressed.

Figure 9:
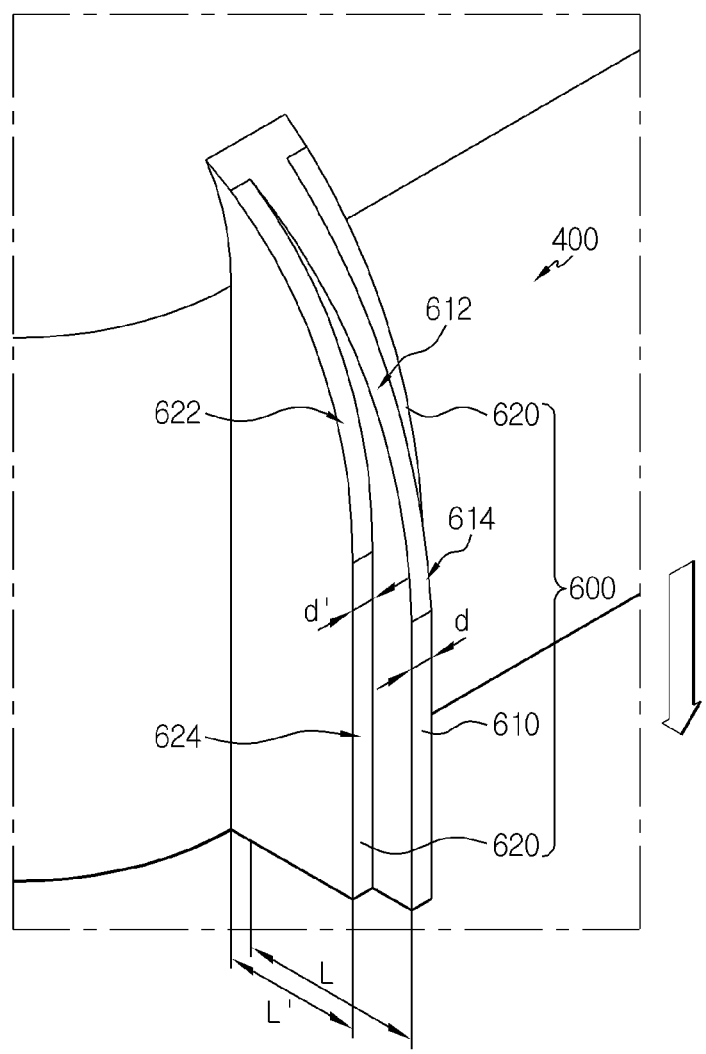
FIG. 9 is a perspective view of a horizontal protruding rib formed in a pack case of a battery pack of the present disclosure.
Figure 10:
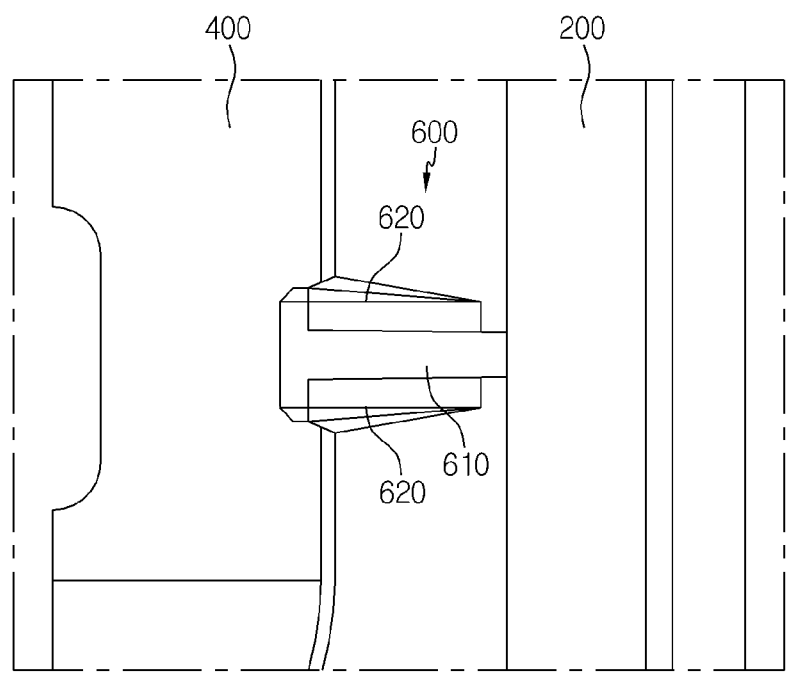
FIG. 10 is a diagram illustrating a method for fixing a cell module assembly by a horizontal protruding rib in a battery pack of the present disclosure.

FIG. 9 is a perspective view of the horizontal protruding rib formed in the pack case of the battery pack of the present disclosure. FIG. 10 is a diagram illustrating a method for fixing the cell module assembly by the horizontal protruding rib in the battery pack of the present disclosure.

Referring to FIG. 9, the horizontal protruding rib 600 is a double rib structure including a first rib 610 that is compressed by the cell module assembly to absorb the thickness tolerance of the cell module assembly and a second rib 620 that is provided on the outer side of the first rib 610 and is not compressed to reinforce the first rib 610. The second rib 620 is disposed at a more rear position than the first rib 610. In this instance, rear refers to a direction opposite to the direction in which the first rib 610 and the second rib 620 face the cell module assembly.

Preferably, the horizontal protruding rib 600 includes the first rib 610 and the second rib 620 provided on each of the two lateral sides of the first rib 610. Even one second rib 620 provided for the first rib 610 can serve to reinforce the first rib 610, but in the case of a structure in which the first rib 610 is sandwiched between the second ribs 620, structural symmetry and consequential integrity is high, and even though a force is applied in any direction, it is possible to respond the force.

The first rib 610 and the second rib 620 may be formed as an integral structure. That is, the first rib 610 and the second rib 620 are seamlessly connected to each other. For example, when the case body 400, including the horizontal protruding rib 600, is manufactured by injection molding and a cavity of a mold for manufacturing the case body 400 is shaped, taking into account the first rib 610 and the second rib 620, followed by injection molding, the case body 400 including the horizontal protruding rib 600 including the first rib 610 and the second rib 620 may be integrally formed. That is, the second rib 620 is not formed by additionally attaching or adhering a separate structure to the first rib 610. Instead, when the first rib 610 and the second rib 620 are integrally formed in the manufacture of the case body 400, the manufacturing process is not complex, and there is no need to consider and manage the coupling of the first rib 610 and the second rib 620 and a material difference between the two that should be considered when the two are separate structures, and besides, it is structurally firm.

The first rib 610 may have a length L protruding further toward the cell module assembly than the second rib 620. That is, the length L of the first rib 610 may be larger than the length L' of the second rib 620. The first rib 610 may have a smaller thickness d than the second rib 620. That is, the thickness d of the first rib 610 may be smaller than the thickness d' of the second rib 620.

When the first rib 610 and the second rib 620 have the same materials and different thicknesses and lengths, it is possible to adjust the extent of compression. That is, the first rib 610 and the second rib 620 may be integrally formed from the same material, but when the first rib 610 is longer and thinner than the second rib 620, the first rib 610 may be compressed by the cell module assembly. When the second rib 620 is shorter and thicker than the first rib 610, the second rib 620 may not be compressed even though an additional force is applied.

Figure 2:
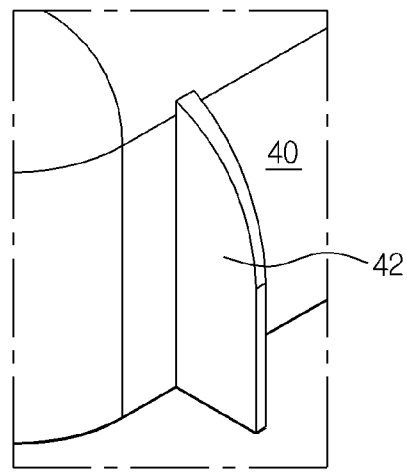
FIGS. 2a and 2b illustrate a method for fixing a cell module assembly by a horizontal protruding rib in a conventional battery pack.
Figure 2:
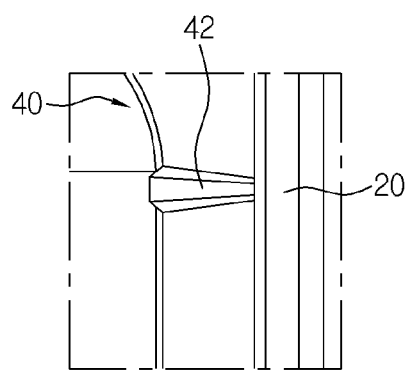

The horizontal protruding rib 600 including the first rib 610 and the second rib 620 may be thicker than the conventional horizontal protruding rib (42 in FIG. 2). Additionally, the horizontal protruding rib 600 may have a relatively large mass. Accordingly, the connection strength between the horizontal protruding rib 600 and the case body 400 is larger than the conventional connection strength. Additionally, when subjected to a force in the thicknesswise direction of the horizontal protruding rib 600, the horizontal protruding rib 600 does not easily deform or break. This double rib structure allows the horizontal protruding rib 600 to have higher structural strength.

The first rib 610 may include a gently curved part 612 having a gradual increase in length toward the cell module assembly along a direction (see the arrow) in which the cell module assembly is received in the case body 400, and a straight line part 614 formed with a uniform length subsequent to the curved part 612, and the second rib 620 may also include a gently curved part 622 having a gradual increase in length toward the cell module assembly along a direction in which the cell module assembly is received in the case body 400 and a straight line part 624 formed with a uniform length subsequent to the curved part 622.

That is to say, each of the first rib 610 and the second rib 620 is designed such that they include a top part and a bottom part, and the top part forms a gently curved part and the bottom part forms a straight line part. The bottom part is usually compressed at the first rib 610 when compressed in the lengthwise direction.

When the first rib 610 includes the curved part 612 and the straight line part 614, and the second rib 620 includes the curved part 622 and the straight line part 624, the top of the horizontal protruding rib 600 has no angled edge. Accordingly, when the cell module assembly is received in the case body 400, it can be smoothly inserted into the bottom of the case body 400 along the curved parts 612, 622 without collision with the angled edges.

Additionally, as shown in FIG. 7, when the plurality of horizontal protruding ribs 600 is formed at facing locations, the cell module assembly should be assembled in a space between the horizontal protruding ribs 600 formed at the opposing sides and facing each other. When the first rib 610 includes the curved part 612 and the straight line part 614, and the second rib 620 includes the curved part 622 and the straight line part 624, the distance between the horizontal protruding ribs 600 facing each other gradually increases along a direction in which the cell module assembly is received in the case body 400 and then becomes uniform.

Accordingly, it is possible to ensure an assembling space margin to some extent through a relatively wide distance when inserting the cell module assembly, and ensure accuracy of assembling through a relatively narrow distance at the point in time in which insertion is nearly completed. When the horizontal protruding rib 600 as described above is formed, there is no need for a separate location correction operation when assembling the cell module assembly, and the tact time in the assembling process is shortened.

Additionally, in this embodiment, the curved part 622 of the second rib 620 is formed more sharply than the curved part 612 of the first rib 610. The first rib 610 and the second rib 620 have a structure in which they are formed at the same curvature to a predetermined point as it goes from the top part to the bottom part, and after the predetermined point, they are separated. Through this, the first rib 610 protrudes further than the second rib 620, and before the second rib 620 touches the cell module assembly, the first rib 610 always touches earlier. As the first rib 610 can be compressed and is softer, the cell module assembly touches the first rib 610 earlier, thereby preventing the problem that the cell module assembly touches the second rib 620 due to an unexpected accident and the uncompressible second rib 620 breaks.

When the inside of the case body 400 is viewed from the upper surface of the case body 400, that is to say, when viewed from the top, the horizontal protruding rib 600 may be a tapered structure having a gradual reduction in thickness as it is closer to the cell module assembly received in the case body 400. To this end, at least one of the first rib 610 and the second rib 620 may be formed with a tapered structure.

For example, when the first rib 610 including the curved part 612 and the straight line part 614 is viewed from the top, the first rib 610 may be a tapered structure having a gradual reduction in thickness as it is closer to the cell module assembly. Likewise, when viewed from the top, the second rib 620 including the curved part 622 and the straight line part 624 may be a tapered structure having a gradual reduction in thickness as it is closer to the cell module assembly. When formed with this tapered structure, the thickness of the area at which the first rib 610 is in direct contact with the cell module assembly is smaller, and the thickness of the area at which the first rib 610 is adhered to the case body 400 is larger. Accordingly, the area of the first rib 610 in direct contact with the cell module assembly is compressed more easily and can absorb the thickness tolerance, and while the area is compressed, the area of the first rib 610 adhered to the case body 400 can support without movement. Also, in the case of the second rib 620, the thickness of the area facing the cell module assembly may be smaller, and the thickness of the area of the second rib 620 adhered to the case body 400 may be larger. This tapered structure is a shape with high structural safety and stiffness.

In the battery pack (100 in FIG. 3), the horizontal protruding rib 600 as shown in FIG. 9 is used to fix the cell module assembly 200 within the case body 400. In assembling the battery pack 100, as shown in FIG. 3, when the cell module assembly 200 is received in the case body 400, the horizontal protruding rib 600 is compressed as shown in FIG. 10. FIG. 10 is an enlarged top view of the horizontal protruding rib 600 when the cell module assembly 200 is received in the case body 400.

The first rib 610 of the horizontal protruding rib 600 is compressed at the time of insertion of the cell module assembly 200, to absorb the thickness tolerance of the cell module assembly 200. However, the second rib 620 is not compressed. The second rib 620 is an additional structure disposed on two sides of the first rib 610, and serves to prevent the first rib 610 from being compressed any longer even though the first rib 610 is compressed. Accordingly, even though the first rib 610 is compressed, the second rib 620 cannot be compressed below the length (L in FIG. 9) protruding toward the cell module assembly 200. Accordingly, there is the lower limit of the extent to which the first rib 610 is compressed when assembling, to prevent the problem of biased assembly that may occur when the first rib 610 keeps being compressed.

Additionally, even though a situation occurs in which the horizontal protruding rib 600 is additionally compressed by the mass of the cell module assembly 200 and the inertia due to an external force applied to the battery pack 100 after assembling is completed, the second rib 620 is not compressed and can withstand. Accordingly, it is possible to prevent the biased location of the cell module assembly 200.

According to various embodiments as described above, in the present disclosure, the outer periphery of the cell module assembly 200 may be tightened more effectively by the horizontal protruding rib 600. The first rib 610 of the horizontal protruding rib 600 is compressible and can absorb the thickness tolerance. The second rib 620 of the horizontal protruding rib 600 is not compressed and reinforces the first rib 610. Accordingly, it is possible to enhance the location fixation of the cell module assembly 200 in the case body 400.

As described above, according to the present disclosure, it is possible to improve the accuracy of assembling the cell module assembly 200 when assembling the battery pack 100, it is possible to prevent the biased location of the cell module assembly 200 from an external force during the use of the battery pack 100, thereby providing the battery pack 100 with high structural integrity and high stability. Additionally, according to the present disclosure, there is provided a vehicle including the battery pack 100. The battery pack 100 may supply power to the electrical equipment of the vehicle or power for engine startup, and may be charged with power generated by the alternator.

Meanwhile, the present disclosure may be applied to a large-scale battery pack mounted in an electric vehicle.

Figure 11:
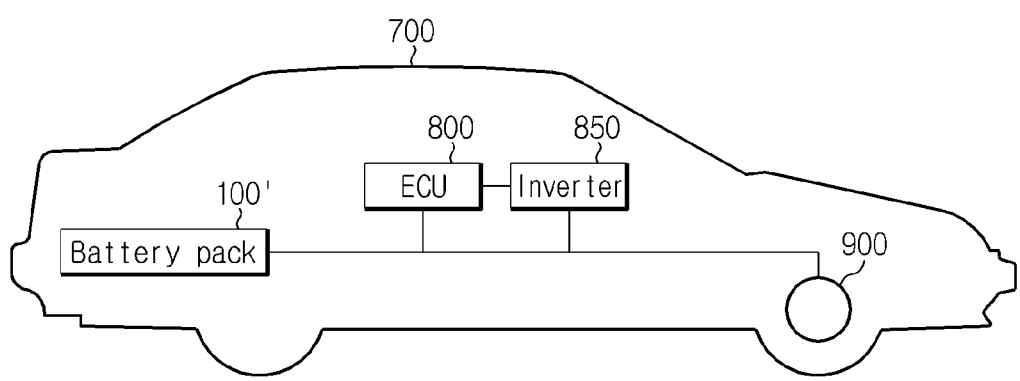
FIG. 11 is a schematic diagram showing a vehicle including a battery pack according to the present disclosure.

FIG. 11 is a schematic diagram showing the vehicle including the battery pack according to the present disclosure.

The vehicle 700 according to the present disclosure may include a battery pack 100' according to the present disclosure, an Electronic Control Unit (ECU) 800, an inverter 850 and a motor 900. Preferably, the vehicle 700 may be an electric vehicle.

The battery pack 100' may be used as an electrical energy source to supply power to the motor 900 to drive the vehicle 700. In this case, the battery pack 100' includes a larger number of cells than the previous embodiment, and has a high nominal voltage of 100V or above. Additionally, the battery pack 100' is identical or similar to the battery pack 100 described previously. Particularly, they are the same in respect of including the horizontal protruding rib (600 in FIG. 9).

The battery pack 100' may be charged or discharged by the inverter 850 by the operation of the motor 900 and/or the internal combustion engine (not shown). The battery pack 100' may be charged by the regenerative charger coupled to the brake. The battery pack 100' may be electrically connected to the motor 900 of the vehicle 700 through the inverter 850.

As described previously, the battery pack 100' includes a BMS. The BMS estimates the state of the cells in the battery pack 100', and manages the battery pack 100' using the estimated state information. For example, the BMS estimates and manages state information of the battery pack 100' such as State Of Charge (SOC), State Of Health (SOH), maximum allowable input/output power and output voltage of the battery pack 100'. Additionally, the BMS controls the charge or discharge of the battery pack 100' using the state information, and besides, may estimate when to replace the battery pack 100'.

The ECU 800 is an electronic control device to control the state of the vehicle 700. For example, the ECU 800 determines torque information based on information of the accelerator, the brake and the speed, and controls the output of the motor 900 according to the torque information.

Additionally, the ECU 800 transmits a control signal to the inverter 850 to allow the battery pack 100' to be charged or discharged based on the state information of the battery pack 100' including SOC and SOH received by the BMS. The inverter 850 allows the battery pack 100' to be charged or discharged based on the control signal of the ECU 800. The motor 900 drives the vehicle 700 based on the control information (for example, torque information) received from the ECU 800 using electrical energy of the battery pack 100'.

The vehicle 700 includes the battery pack 100' according to the present disclosure, and the battery pack 100' fixes the cell module assembly 200 through the horizontal protruding rib 600 as described previously, thereby solving the problem with biased fixation location of the cell module assembly 200 by an external force. Accordingly, the structural stability of the battery pack 100' is maintained against a force applied from the outside while the vehicle 700 including the battery pack 100' is used, for example, vibration applied to the battery pack 100' while the vehicle 700 is driving, or by an impact applied to the battery pack 100' due to collision of the vehicle 700. Additionally, the battery pack 100' has high stability and can be used for a long time, and thus the vehicle 700 including the same is safe and easy to operate.

While the preferred embodiments of the present disclosure have been hereinabove illustrated and described, the present disclosure is not limited to the above-described particular embodiments, and it is obvious to those skilled in the art that various modifications may be made thereto without departing from the key subject matter of the present disclosure defined in the claims, and such modifications should not be understood individually from the technical aspects or scope of the present disclosure.

What is claimed is:

1. A battery pack comprising:
a cell module assembly;
a pack case including a case body to receive the cell module assembly and a case cover coupleable with the case body to package the cell module assembly; and
a plurality of horizontal protruding ribs protruding toward the cell module assembly at facing locations and in a direction parallel to a stack direction of cells in the cell module assembly at an inner lower end of the case body, the plurality of horizontal protruding ribs arranged to engage opposing surfaces of the cell module assembly along a direction parallel to the stack direction of the cells of the cell module assembly when the cell module assembly is inserted therebetween,
wherein each one of the plurality of horizontal protruding ribs is a double rib structure including a first rib which is compressible by the cell module assembly to absorb a thickness tolerance of the cell module assembly, and at least one uncompressible second rib provided on a lateral side of the first rib and disposed at a more rear position than the first rib to reinforce the first rib.

2. The battery pack according to claim 1, wherein the at least one second rib includes two second ribs, each of the second ribs positioned on an opposite lateral side of the first rib.

3. The battery pack according to claim 1, wherein the first rib and the second rib are an integrally formed structure.

4. The battery pack according to claim 1, wherein the first rib has a length protruding further toward the cell module assembly than the second rib, and a smaller thickness than the second rib.

5. The battery pack according to claim 4, wherein the first rib and the second rib include a curved part having a gradual increase in length toward the cell module assembly along a direction in which the cell module assembly is received in the case body, and a straight line part formed with a uniform length proximate to the curved part.

6. The battery pack according to claim 5, wherein the curved part of the second rib is formed more sharply than the curved part of the first rib.

7. The battery pack according to claim 1, wherein each one of the plurality of horizontal protruding ribs defines a tapered structure having a gradual reduction in thickness as it is closer to the cell module assembly when an inside of the case body is viewed from an upper surface of the case body.

8. The battery pack according to claim 1, wherein the case body and the horizontal protruding ribs are an integrally formed structure.

9. A vehicle comprising the battery pack according to claim 1.

* * * * *